(No Model.) 2 Sheets—Sheet 2.
J. SHICKLE.
HARVESTER.
No. 382,910. Patented May 15, 1888.
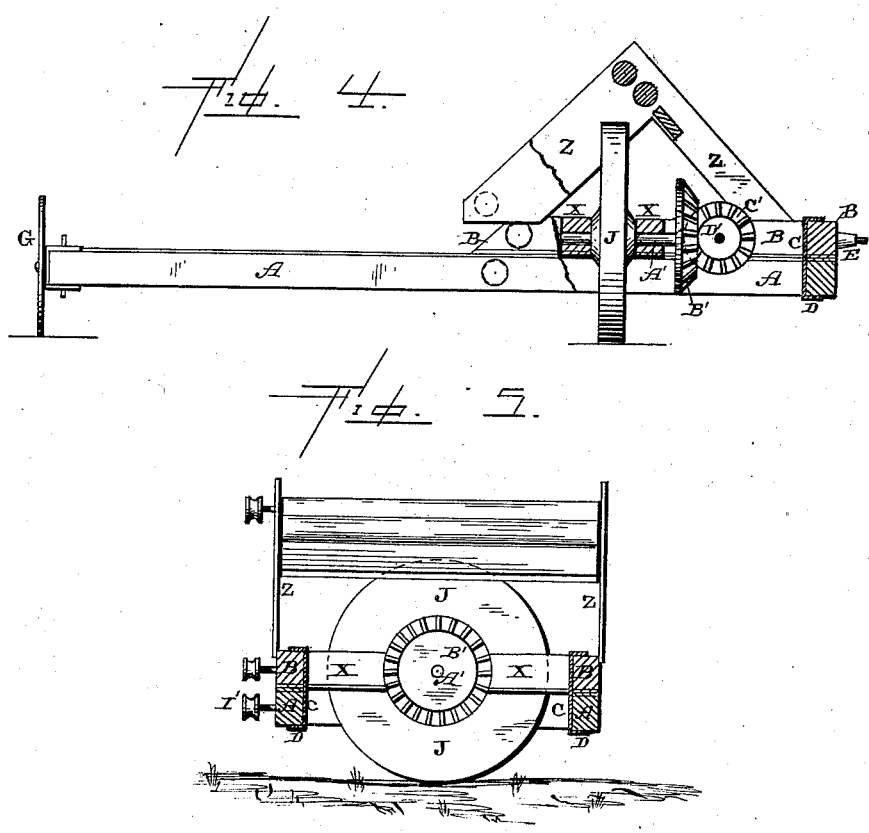

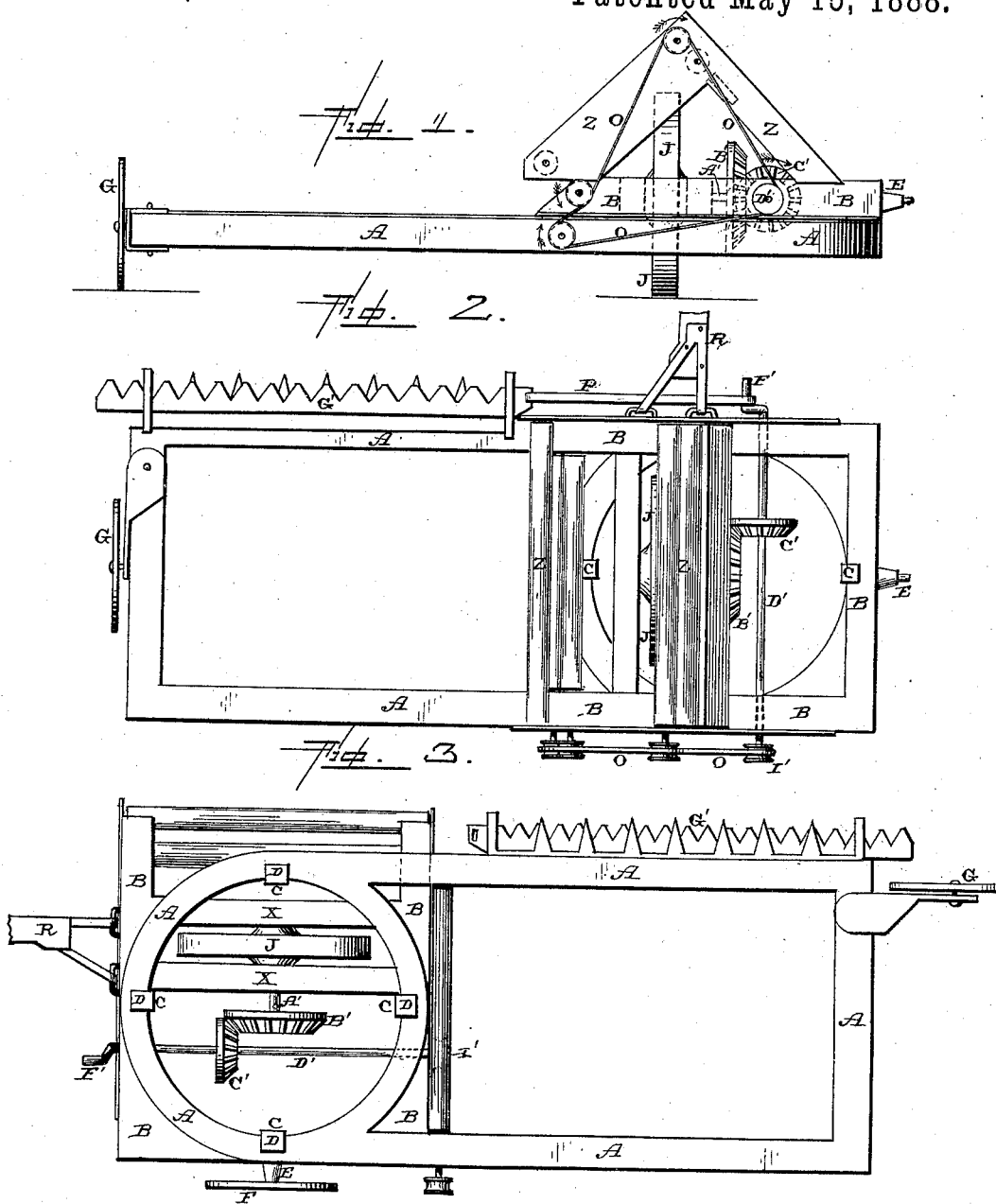

UNITED STATES PATENT OFFICE.

JOSEPH SHICKLE, OF BROADWAY, VIRGINIA.

HARVESTER.

SPECIFICATION forming part of Letters Patent No. 382,910, dated May 15, 1888.

Application filed August 15, 1887. Serial No. 246,972. (No model.)

*To all whom it may concern:*

Be it known that I, JOSEPH SHICKLE, of Broadway, in the county of Rockingham and State of Virginia, have invented certain new and useful Improvements in Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in harvesters; and it consists in the combination of the platform-frame with a supplemental frame, to which the tongue is secured, and in which the drive-wheel is journaled, and which frame is swiveled upon the outer end of the platform-frame, so that the tongue and frame can be freely turned through a quarter of a circle without affecting the platform-frame and the grain-wheel, which is pivoted to the outer end of the platform-frame, the wheel-frame being provided with a spindle to receive an extra wheel to support the machine when being transported from place to place, as will be more fully described hereinafter.

The object of my invention is to swivel the supplemental frame carrying the wheel, and having the tongue secured thereto upon the outer end of the platform-frame, and to place all of the operating parts of the harvester upon this frame, and thus enable the main wheel, the wheel-frame, and the operating parts of the machine to be freely turned through a quarter of a circle, so that the tongue will extend in a line with the length of the platform-frame, and thus enable the machine to be drawn endwise from place to place without taking up as much room as when moved in the ordinary manner.

Figure 1 is a rear elevation of a harvester embodying my invention. Fig. 2 is a plan view of the same. Fig. 3 is an inverted view of the same, showing the elevator-frame and the tongue turned into a line with the length of the platform-frame and at right angles to what is shown in Figs. 1 and 2. Fig. 4 is a rear elevation shown partly in section. Fig. 5 is a vertical section, taken through the elevator, and at right angles to what is shown in Fig. 4.

A represents the platform-frame of an ordinary harvester, and B a supplemental frame, which is swiveled upon the inner end of the platform-frame. The inner end of the platform-frame extends to the outer side of the supplemental frame B, and has made through it a suitable opening, so that the frame B can be swiveled in position upon its top by means of clips C. These clips are rigidly secured to the supplemental frame B, extend down through the openings in both the supplemental frame and the platform-frame, and have their lower ends, D, turned outward under the edge of the opening through the platform-frame, so as to swivel the two frames together.

The frame B is placed upon the top of the outer end of the platform-frame, so that the elevator Z and the operating machinery of the harvester can be placed upon this supplemental frame, and thus always be caused to move with the frame and tongue when they are turned either in a line with the platform-frame, as shown in Fig. 3, or at an angle thereto, as shown in Figs. 1, 2, 4, and 5.

The end of the platform-frame forms a support for the wheel-frame, and all of the operating parts being placed upon the top of the latter frame, it can be turned freely without having any of the operating parts interfered with, except the operating-chain O and the pitman P, which would not be the case if the frame were placed in any other position. Secured to this frame B is the tongue R, by means of which the machine is drawn forward in the usual manner while the harvester is at work in the field, and by means of which the wheel-frame is turned through a quarter of a circle upon the top of the stubble end of the platform-frame.

When the harvester is to be brought into use, the tongue and frame B are swung around, so that the tongue extends at a right angle to the platform-frame, as shown in Fig. 2, or when the harvester is to be moved from place to place the tongue and supplemental frame are turned through a quarter of a circle and made to stand in a line with the length of the platform-frame, as shown in Fig. 3.

All of the elevating and operating machinery is placed upon the top of the frame B, and is thus separate and independent of the platform-frame, leaving the supplemental frame B to be turned through a quarter of a circle by means of the tongue, without affecting the platform-frame A in any manner.

Extending across the opening which is made in the supplemental frame B are suitable timbers, X, and upon these timbers the main wheel J is journaled. This wheel forms the support for the outer end of the entire machine and operates the working parts of the harvester in the usual manner. Upon the shaft or axle A' of the wheel J is secured the wheel B', which meshes with the wheel C', placed upon the shaft D', which extends at right angles to the shaft A', and which has the crank F' formed upon one end. This crank F' communicates motion to the sickle G', through the connecting-rod P. Upon the opposite end of the shaft D' from the crank F' is secured the driving-pulley I', around which the driving-chain O passes for the purpose of operating the different parts of the elevator Z. Before the platform-frame can be swung around into the position shown in Fig. 3 the connecting-rod P must be detached and the driving-chain O must be thrown off from the pulley I', so as to leave the platform-frame free to be moved. When the supplemental frame B is swung around by means of the tongue, this wheel turns with the frame, as shown in Fig. 3, and thus enables the whole machine to be moved endwise.

Secured to one side of the supplemental wheel-frame B is the spindle E, upon which an extra wheel, F, is placed, which assists in supporting the inner end of the platform and the machinery placed upon the top of the supplemental frame B, when the tongue and frame are turned into line with the platform-frame. This wheel F is only placed upon the spindle when the machine is to be transported from one place to another. When the tongue and wheel-frame are being swung around so as to extend at an angle to the platform-frame, this wheel must be removed. When the tongue and supplemental frame are turned into a line with the platform-frame, the whole machine is supported upon the two wheels F J at one end and the grain-wheel G at the other. When the parts are in the position shown in Fig. 3, the harvester can be drawn endwise from place to place, and will take up a very small space when moving along the road. Where no provision is made for drawing the harvester endwise, it is sometimes very difficult to get it through a gate, or to move it along a country road, on account of the amount of space it takes up. When the supplemental frame and tongue are in the position shown in Fig. 2, they may be fastened in any suitable manner. The grain-wheel G is pivoted to the grain end of the platform-frame, so as to be readily turned, and thus follow the movement of the platform-frame. When the tongue and supplemental frame are turned at right angles to the platform-frame, the forward movement of the machine causes this grain-wheel G to swing around, so as to move forward with the platform, and when the parts are in the position shown in Fig. 3 the wheel G swings around, so as to follow the end of the platform-frame.

Having thus described my invention, I claim—

1. In a harvester, the combination of a supplemental frame, in which the grain-wheel is mounted, having the tongue secured thereto, and the platform-frame, the supplemental wheel-carrying frame being swiveled upon the stubble end of the platform-frame, whereby said frame can be swung around and bring the tongue and main wheel into line with the platform, substantially as shown.

2. In a harvester, the combination of a supplemental wheel-carrying frame, the driving-wheel journaled therein, the tongue secured to the wheel-frame, the platform-frame, upon the inner end of which the wheel-carrying frame is swiveled, and the pivoted grain-wheel on the grain end of the platform-frame, whereby the grain-wheel, the supplemental or wheel-carrying frame, and the tongue can be turned into line with the platform-frame, substantially as described.

3. The combination, in a harvester, of a supplemental wheel-carrying frame, in which the driving-wheel is journaled, and to which the tongue is secured, of the platform-frame, upon which is swiveled at its stubble end the wheel-carrying frame, and which is supported at its grain end by the pivoted grain-wheel, the said wheel-carrying frame having a spindle adapted to receive a supplemental wheel when the wheel-carrying frame and the tongue are turned into a line with the platform-frame for the purpose of transporting the machine, substantially as set forth.

In testimony whereof I affix my signature in presence of two witnesses.

JOS. SHICKLE.

Witnesses:
W. K. V. ENOS,
D. B. RHODES.